(12) United States Patent  (10) Patent No.: US 7,698,256 B1
Wang  (45) Date of Patent: Apr. 13, 2010

(54) HISTORY SUPPORT FOR STATELESS JAVASCRIPT WEB CLIENT

(75) Inventor: Zhao Y. Wang, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 554 days.

(21) Appl. No.: 11/291,304

(22) Filed: Nov. 30, 2005

(51) Int. Cl.
*G06F 7/00* (2006.01)
*G06F 15/16* (2006.01)

(52) U.S. Cl. .......................... 707/3; 709/203; 709/245; 707/200

(58) Field of Classification Search ................. 707/200; 709/203, 245
See application file for complete search history.

(56) References Cited

U.S. PATENT DOCUMENTS

| | | | | |
|---|---|---|---|---|
| 6,035,330 | A * | 3/2000 | Astiz et al. ................. | 707/102 |
| 6,047,313 | A * | 4/2000 | Hashimoto et al. .......... | 709/203 |
| 6,460,071 | B1 * | 10/2002 | Hoffman .................... | 707/200 |
| 6,940,491 | B2 * | 9/2005 | Incertis Carro ............ | 715/700 |
| 6,947,943 | B2 * | 9/2005 | DeAnna et al. ............. | 707/100 |
| 7,062,475 | B1 * | 6/2006 | Szabo et al. ................. | 706/11 |
| 7,107,285 | B2 * | 9/2006 | von Kaenel et al. ............ | 707/3 |
| 7,249,315 | B2 * | 7/2007 | Moetteli ..................... | 715/513 |
| 2005/0114782 | A1 * | 5/2005 | Klinger ...................... | 715/742 |

* cited by examiner

*Primary Examiner*—Vincent Boccio
(74) *Attorney, Agent, or Firm*—Martine Penilla & Gencarella, LLP.

(57) ABSTRACT

Methods and systems are provided for providing history support in a stateless Web-based application. These methods and systems allow a browser to interface with one or multiple data frames via a common history frame that facilitates providing navigation history support and facilitates rendering data to the browser user interface. By utilizing the common history frame, the methods and systems of the present invention provide navigation history capabilities in a stateless Web-based application.

19 Claims, 6 Drawing Sheets

HISTORY SUPPORT FOR STATELESS JAVASCRIPT WEB CLIENT

BACKGROUND

1. Field of the Invention

This invention relates generally to Web browser history support, and more particularly to a method for providing history support in a stateless Web client environment.

2. Description of the Related Art

Conventionally, most Web browsers have a history support capability. The history support capability allows a user to navigate backward or forward to the location of a document, a file, or any other Internet resource, etc. that the user has previously visited. The Web browser provides history support by registering an Internet address of the Internet resource, called a Uniform Resource Locator (URL), and its associated content in the browser's "History Register" each time the user visits the resource. The "History Register" is typically implemented as a cache directory that contains a copy of the resource content so that when the user selects the "Back" or "Forward" button from the browser menu, no significant reloading of data needs to occur to re-display the content of the resource.

In some Web-based client systems, however, the browser's user interface is implemented using a stateless scripting language, e.g. Javascript, etc. These systems can provide a Javascript-based user interface in an attempt to minimize the client-server bandwidth utilization by supporting the capability to download dynamic content (e.g. folder lists, message lists, and message content) from a server to the client browser as Javascript objects. The Javascript objects are then transformed by a client-based Javascript program and output as Hyper Text Markup Language (HTML) code that can be rendered by the browser. Thus, every user action within the browser's user interface is handled by a Javascript engine which invokes a Javascript call that ultimately leads to the loading of content data from the server to the browser user interface. However, the Javascript engine is itself stateless—i.e. the entry point of the Javascript engine is an event that is triggered by a user selection and the exit point is the return of a handler function that was invoked by the Javascript engine to handle the user-triggered event. Because, the Javscript engine does not register prior events and the URL is embedded in the Javascript function call and therefore hidden from the browser, it is impossible to navigate backward or forward to the previously visited pages because the sequence of events is lost as a result of their being handled by the stateless Javascript engine. For example, in a stateless Web-based e-mail system, if a user selects the "Inbox" hyperlink, selects a message A from the inbox folder, selects the "Send" hyperlink, and selects a message B from the send folder, the user cannot then select the "Back" button from the browser menu bar to go back to the "Send" folder or to message A because the navigation sequence is lost.

In view of the forgoing, there is a need for an approach for providing history support that enhances usability and scalability in a stateless Web-based client system.

SUMMARY

In one embodiment, the present invention provides a method for enabling a computer system to provide history support. The method comprises enabling the execution of a client code module, the client code module being associated with a plurality of data frames, and a history frame. Each data frame of the plurality of data frames is capable of storing content data and the history frame includes a data frame registry having an entry for each data frame of the plurality of data frames and a history support registry. Next, the method comprises enabling the display of a first component and a second component in a user interface, wherein the first component corresponds to a resource attribute and a target attribute, a value of the target attribute specifying the history frame. The method also comprises enabling the selection of the first component, wherein the selection of the first component comprises generating a selection notification, the selection notification including a value of the resource attribute and the value of the target attribute. Next, the method comprises enabling a response to the selection notification. The response to the selection notification comprises parsing the selection notification to extract the value of the resource attribute, storing an entry corresponding to the selection of the first component in the history support registry wherein the entry corresponding to the selection of the first component comprises the value of the resource attribute. The response to the selection notification further comprises identifying a data frame from the plurality of data frames, wherein the data frame corresponds to the value of the resource attribute. The response to the selection notification further comprises instructing the data frame to retrieve the content data from a location specified by the value of the resource attribute, and instructing the data frame to load the content data in the user interface. Next the method comprises enabling the selection of the second component, wherein selecting of the second component comprises locating an entry in the history support registry, the entry in the history support registry corresponding to the selection of the second component. The selecting of the second component further comprises loading content data in the user interface, the content data corresponding to the entry in the history support registry.

In another embodiment, the present invention provides a computer system for providing history support. The computer system comprises a server code module capable of execution by the computer, the server code module being capable of downloading content data. The computer system further comprises a client code module capable of execution by the computer, the client code module being associated with a user interface, a plurality of data frames, and a history frame. The user interface including a component corresponding to a resource attribute and a target attribute, wherein a selection of the component generates a selection notification, the selection notification including a value the resource attribute and a value of the target attribute. Each data frame of the plurality of data frames is capable of storing the content data and loading the content data in the user interface. The history frame is capable of enabling the storage of a navigation history including an entry corresponding to the selection of the component wherein the entry corresponding to the selection of the component comprises the value of the resource attribute. The history frame is further capable of enabling a response to the selection notification and identifying a data frame from the plurality of data frames, the data frame corresponding to the value of the resource attribute, enabling the data frame to retrieve the content data from the server code module, and enabling the data frame to load the content data in the user interface.

In another embodiment, the present invention provides a computer-readable media for directing a computer system to provide history support. The computer-readable media comprises instructions for executing a client code module. The client code module is associated with a plurality of data frames, wherein each data frame of the plurality of data frames is capable of storing content data. The client code module is also associated with a history frame, the history frame including a data frame registry having an entry for each data frame of the plurality of data frames and a history support registry. The computer-readable media also comprises instructions for displaying a first component and a second component in a user interface, wherein the first component corresponds to a resource attribute and a target attribute, a value of the target attribute specifying the history frame. The computer-readable media further comprises instructions for selecting the first component, wherein selecting the first component comprises instructions for generating a selection notification, the selection notification including a value of the resource attribute and the value of the target attribute. The computer-readable media also comprises instructions for responding to the selection notification, wherein responding to the selection notification includes instructions for parsing the selection notification to extract the value of the resource attribute. The computer-readable media also comprises instructions for registering the selection in the history support registry according to the value of the resource attribute. Identifying a data frame from the plurality of data frames, wherein the data frame corresponds to the value of the resource attribute. Instructing the data frame to retrieve the content data from a location specified by the value of the resource attribute, and instructing the data frame to load the content data in the user interface. The computer-readable media further comprises instructions for selecting the second component, wherein selecting the second component comprises instructions for locating an entry in the history support registry, the entry in the history support registry corresponding to the selection of the second component. Selecting the component further comprises instructions for loading content data in the user interface, the content data corresponding to the entry in the history support registry.

In another embodiment the present invention provides a method for enabling history navigation. The method comprises generating components to be rendered by a browser, at least one of the components being associated with a resource attribute and a target attribute, wherein selection of the at least one of the components is configured to initiate referencing a history frame corresponding to the target attribute in response to a selection notification generated by the selection of one of the components, the history frame including logic for parsing the resource attribute from the selection notification to identify a data frame, the including stateless executable code to be rendered by the browser. The history frame also including logic for saving the resource attribute of the selected component in the history frame, such that the history frame having the saved resource attribute enables history navigation through the browser utilizing the resource attribute saved in the history frame.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

An approach is provided that enhances usability and scalability in a stateless Web-based system. The approach allows existing stateless Web-based multi-frame applications to behave like single-frame applications and to utilize a common data frame that facilitates maintaining browser navigation history. In particular, "Back" button support is a problematic area of Javascript Web applications and, with the advent of Asynchronous JavaScript and XML (AJAX) and Web 2.0, the issue has become increasing worse due to the complexity and the underlying stateless/historyless nature of Javascript engines. The embodiments of the present invention overcome these disadvantages by providing history support capabilities in stateless JavaScript-based Web-client environments, AJAX-based Web-client environments, etc.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

The present invention includes several aspects and is presented below and discussed in connection with the Figures and embodiments. First, one embodiment of an overview of the present invention is presented. Next, embodiments of the features of the method for providing history support are discussed. Finally, one embodiment of standard hardware appropriate for use with the present invention is described.

Figure 1A:
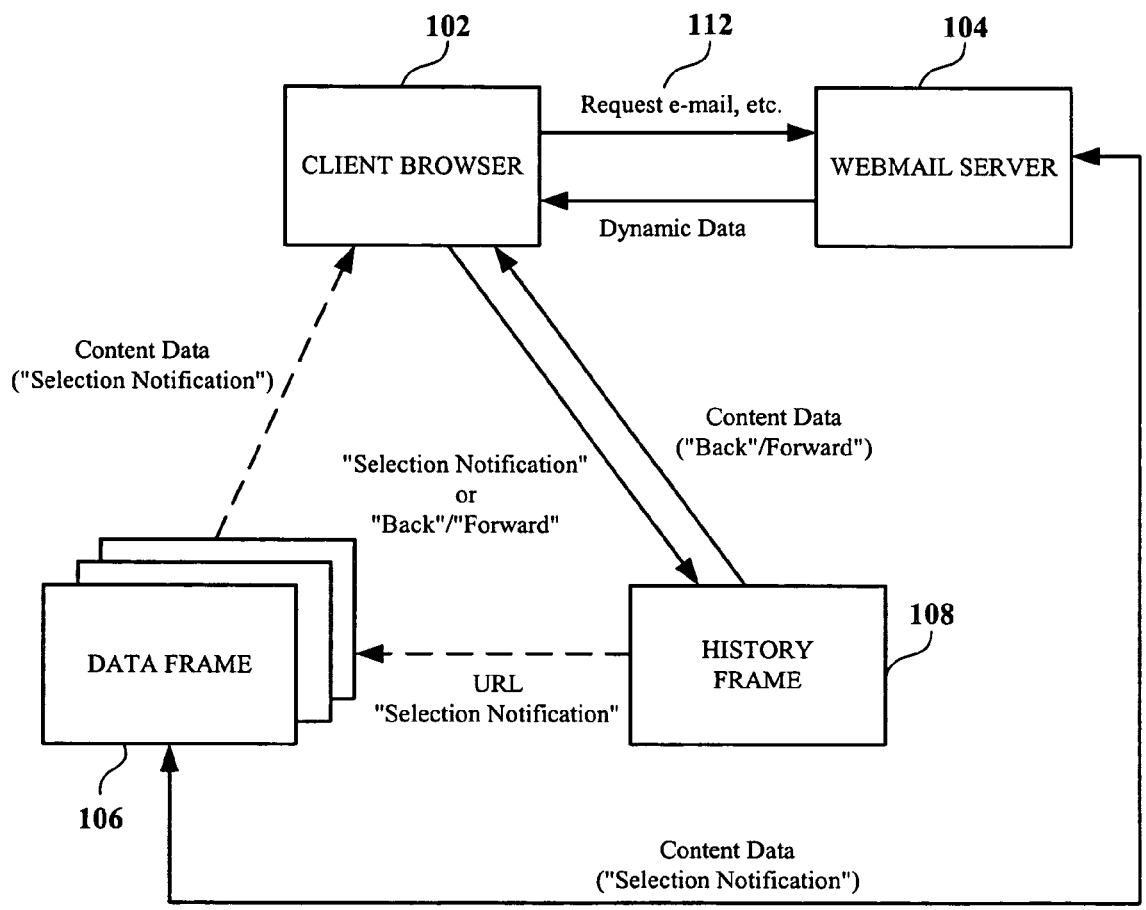
FIG. 1A is a block diagram illustrating a system for providing history support, in accordance with an embodiment of the present invention.

In FIG. 1A, an embodiment of the present invention provides a system 100 that includes a Client Browser (Web browser) 102 and a Webmail Server (Web-based e-mail server) 104. The Client Browser 102 can be implemented as a client code module software application executing on a computer (not shown) that allows a user to view web pages and interact with various types of Internet resources, including resources provided by the Webmail Server 104 that facilitate composing, sending and receiving e-mail, etc. It is important to note, however, that the present invention is not limited to the Web-based client e-mail system 100 embodied in FIG. 1, but can include a non-email based system, a server-based system, any combination thereof, etc.

In the present embodiment, as shown in FIG. 1A, an e-mail request 112 is sent by a user from the Client Browser 102 to the Webmail Server 104. Upon receiving the e-mail request 112, the Webmail Server 104 downloads the dynamic data content associated with the user e-mail account, e.g. folder list, message list, message content etc., to the Client Browser 102 as Javascript objects which are then used to populate a User Interface (see discussion of FIG. 1B below) of the Client Browser 102. However, it is important to note that the present invention is not restricted to a particular type or form of data that can be downloaded from the Webmail Server 104 to the Client Browser 102 to populate the Client Browser 102 user interface.

Referring still to FIG. 1A, in one embodiment of the present invention, the Client Browser 102 interfaces with a History Frame 108. Specifically, each user selection of a Hyperlink 118 (see FIG. 1B) from the user interface of the Client Browser 102 generates a "selection notification" and registers the selection in the History Frame 108 to provide history support for the Client Browser 102. In an embodiment of the present invention, the Client Browser 102 is capable of providing history support because a URL specified in a resource attribute associated with the selected Hyperlink 118 is registered in the History Frame 108 by storing the URL in a History Support Registry 126 of the History Frame 108, as discussed in detail below in FIGS. 1B and 1C.

The Client Browser 102 further interfaces with a plurality of Data Frames 106 via the History Frame 108 in response to the "selection notification." Today, in many multi-frame Web browser application environments, browsers utilize multiple data frames to cache data that is displayed in the browser user interface. Typically, each data frame corresponds to an area inside the browser window (usually a square or a rectangular area) and the data frame is responsible for displaying its own data in that area of the user interface. Thus, each selectable hyperlink in the browser user interface can correspond to one of multiple data frames so that when a hyperlink is selected the corresponding data frame is responsible for rendering its content data to the browser user interface in response to the selection. The content data associated with a data frame can be the content of a file, a document, etc. that is located at a particular URL, for example "http://www.sun.com".

In an embodiment of the present invention, however, the History Frame 108 is designated as a common data frame for each selectable Hyperlink 118 irrespective of which Data Frame 106 actually holds the content data corresponding to the hyperlink selection, i.e. the History Frame 108 essentially acts as a "hidden" data frame. In this manner, an embodiment of the present invention allows a multi-frame Web application to behave like a single-frame Web application through the History Frame 108. The History Frame 108 is utilized as a common data frame, in part, to reduce the complexity that can result in maintaining a navigation history, where such complexity occurs when a browser is required to keep track of each Data Frame 106 corresponding to a Hyperlink 118 selection.

Additionally, and referring still to FIG. 1A, each user selection of "Back" 117 or "Forward" 119 (see FIG. 1B) from the user interface of the Client Browser 102 causes the Client Browser 102 to locate a URL that the History Frame 108 has visited and reload the content data corresponding to the URL from the History Support Registry 126 of the History Frame 108 in the Client Browser 102 user interface, as discussed in detail below with respect to FIG. 1C.

Figure 1B:
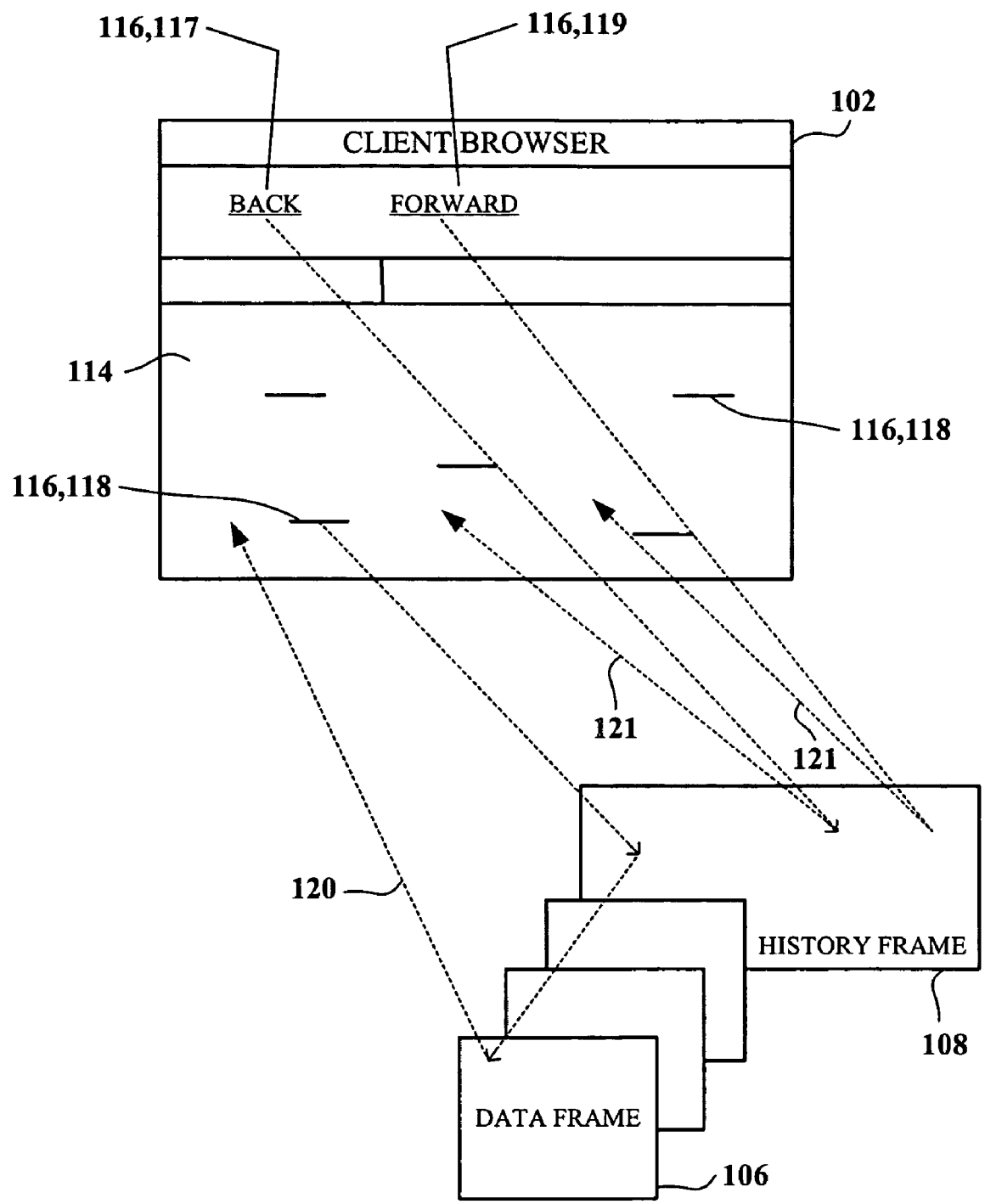
FIG. 1B is a generalized illustration of a browser user interface, in accordance with an embodiment of the present invention.

Referring to FIG. 1B, in an embodiment of the present invention, the Client Browser 102 includes a User Interface 114 that can contain selectable Components 116. In one embodiment, one or more Components 116 are implemented as Hyperlinks 118. Each Hyperlink 118 has associated with it a resource attribute and a target attribute. Specifically, in one embodiment, the Hyperlink 118 is implemented utilizing a HTML (Hyper Text Markup Language) function call that designates a URL in a value of the resource attribute and designates the History Frame 108 in a value of the target attribute, for example: <a href="URL" target="historyFrame">. Using this example, the Hyperlink 118 is selectable by the user where doing so "loads" 120 content data originating from a location of a resource (file, document, etc.) specified in the "href" resource attribute of the HTML function call in a Data Frame 106 via the History Frame 108 which, for purposes of illustration, is designated in the present example as "historyFrame."

By using an HTML function call to handle the Hyperlink 118 selection, rather than using a Javascript function call, or any other stateless scripting language which embeds the "URL" value, a sequence of user actions can be maintained and the navigation history capabilities of the Client Browser 102 which are managed by the History Frame 108 are exploited. As a result, if the user selects, for example, a Message A from the "Inbox" folder, then selects a "Send" folder hyperlink and selects a Message B from the "Send" folder the user can press the "Back" button or "Forward" button from the Client Browser 102 user interface to enable navigation through the sequence of actions by utilizing the navigation history that is maintained in the History Frame 108.

In one embodiment of the present invention, the selectable Components 116 of the Client Browser 102 User Interface 114 also include "Back" 117 and "Forward" 119. "Back" 117 and "Forward" 119 are selectable by the user where doing so "reloads" 121 the content data corresponding to a URL into the Client Browser 102 User Interface 114 from a History Support Registry 126 (see FIG. 1C) of the History Frame 108, as discussed in detail with respect to FIG. 1C below. The "Back" 117 and "Forward" 119 can be implemented as buttons, hyperlinks, etc.

Figure 1C:
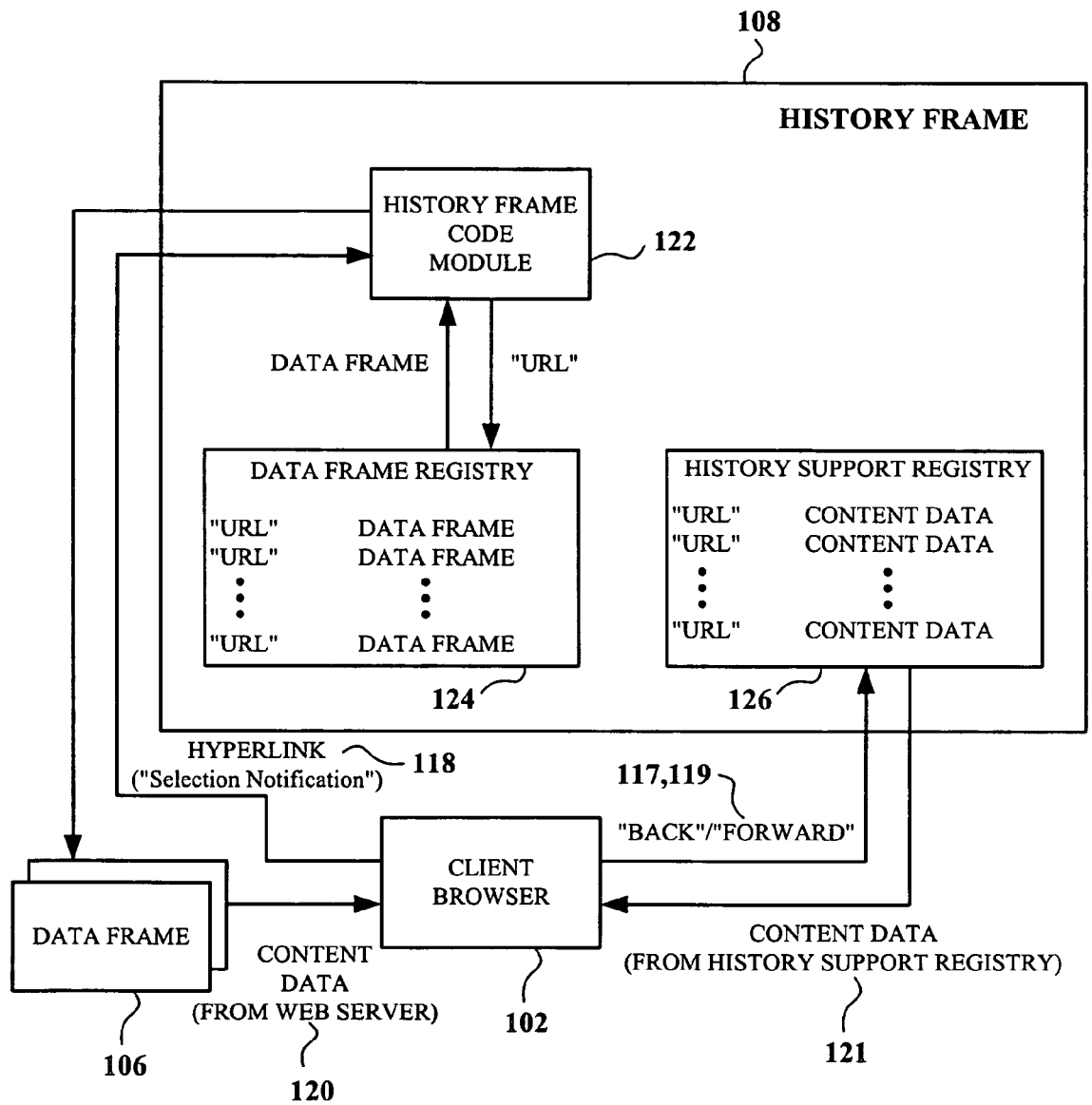
FIG. 1C is a block diagram illustrating a history frame, in accordance with an embodiment of the present invention.

Referring now to FIG. 1C, in one embodiment of the present invention, the History Frame 108 includes a History Frame Code Module 122, a Data Frame Registry 124, and a History Support Registry 126. The Data Frame Registry 124 is a registry of every Data Frame 106 that is associated with the Client Browser 102. The History Support Registry 126 is a registry of the URLs and associated content data that correspond to user selections in the Client Browser 102.

In one embodiment of the present invention, the History Support Registry 126 can contain the actual data content of the registered URL. Specifically, the data content for a URL, which was saved in the Client Browser's 102 cache directory when a user selected the URL, is stored in the History Support Registry 126. As a result, when a user selects the "Back" 117 or "Forward" 119 button from the Client Browser 102 window, no significant reloading of data beyond the content data that is stored in the History Frame 108 needs to occur to render the data to the Client Browser 102 user interface. For example, each user selection of "Back" 117 or "Forward 119 from the Client Browser 102 causes the Client Browser 102 to locate a URL in the History Support Registry 126 that corresponds to where the History Frame 108 has visited as a result of the user selections. The Client Browser 102 then reloads 121 the content data associated with the URL in the Client Browser 102 user interface from the History Support Registry 126.

In another embodiment of the present invention, as previously mentioned, each user selection of a Hyperlink 118 from the Client Browser 102 generates a "selection notification" by invoking the HTML function call. The History Frame Code Module 122 parses the "selection notification" to extract the value of the "href" resource attribute specified in the HTML function call. In one embodiment, the value of the resource attribute is generally a URL. The History Frame Code Module 122 then, utilizing the extracted URL (or other extracted resource value), performs a lookup in the Data Frame Registry 124 to determine which Data Frame 106 actually holds the content data corresponding to a particular selection notification and instructs that Data Frame 106 to "load" or render 120 its corresponding content data to the Client Browser 102 user interface. The Client Browser 102 stores the URL and its associated content data in the History Support Registry 126 to provide navigation history support, as discussed below.

Figure 2:
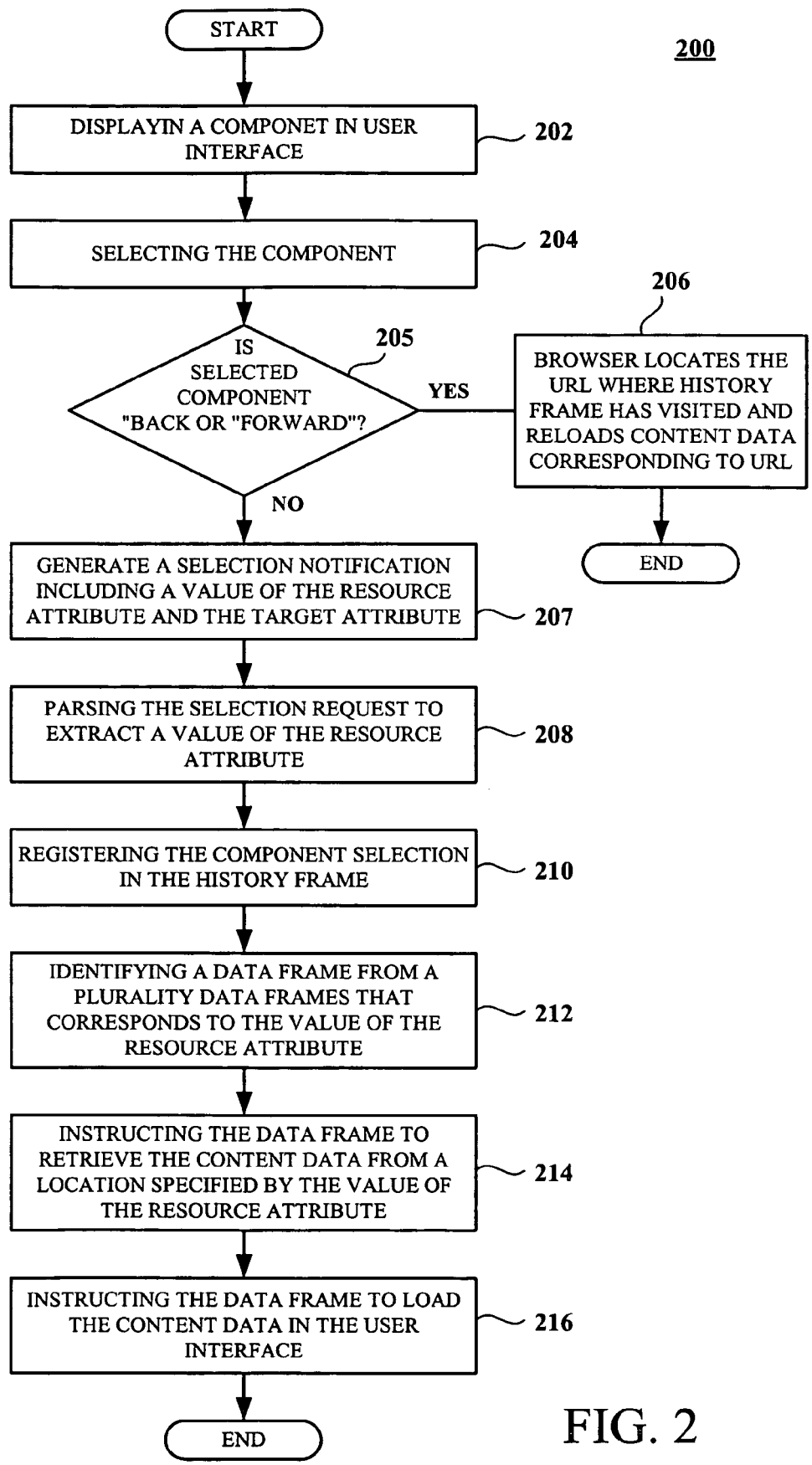
FIG. 2 is a flowchart showing a method for providing history support, in accordance with an embodiment of the present invention.

FIG. 2 is a flowchart showing a method 200 for providing history support for a stateless Web client browser application, in accordance with an embodiment of the present invention.

In an initial component setup operation 202, each Component 116 (see FIG. 1B) of the Client Browser 102 (see FIG. 1) user interface is displayed and made selectable by a user so that user selection causes the History Frame 108 (see FIG. 1) to facilitate rendering the content data associated with the user selection to the User Interface 114 (see FIG. 1B) of the Client Browser 102 for display. "Back" 117 (see FIG. 1B) and "Forward" 119 (see FIG. 1B) are implemented as Components 116 to facilitate the retrieval of content data from the History Frame 108 that is associated with the navigation history of the Client Browser 102.

As previously mentioned, in an embodiment of the present invention, a Hyperlink 118 (see FIG. 1B) is implemented as a Component 116 utilizing an HTML function call that designates a common History Frame 108 in the "target" attribute. For example, <a href="URL" target="historyFrame">. This HTML syntax is utilized in place of a conventional Javascript (or other stateless scripting language) function call to maintain the browser history support functionality. It is important to note, however, that the present invention is not limited to HTML function calls. As previously mentioned, history support cannot be maintained when a Javascript function call is used since the Javascript engine that handles Javascript calls is stateless and, therefore, does keep track of navigation history.

In a selection operation 204, the Hyperlink 118, the "Back" button 117, or the "Forward" button 119 of the Client Browser 102 User Interface 114 is selected. In a determine selection operation 205, the method 200 continues with operation 206 where the "Back" or the "Forward" buttons are selected. Otherwise, the method 200 continues with operation 207.

In a locate history data operation 206, the Client Browser 102 performs a lookup in the History Support Registry 126 to locate the URL corresponding to where the History Frame 108 has visited. The Client Browser 102 then reloads the content data that corresponds to the URL in the Client Browser 102 user interface from the History Frame Registry 126.

In a generate selection notification operation 207, a selection notification is generated when the user selects a Hyperlink 118 from the Client Browser 102 User Interface 114. In one embodiment, the selection notification, as previously mentioned, includes a value of the resource attribute and a value of the target attribute. In one embodiment, the value of the target attribute is set to the History Frame 108 and the value of the resource attribute can be set to an Internet resource (e.g. a document, a file, or any other Internet resource, etc.) called a URL. In one embodiment of the present invention, as previously mentioned, the selection notification is implemented utilizing a HTML function call. For example, <a href="URL" target="historyFrame">.

In a parsing operation 208, a History Frame Code Module 122 (see FIG. 1C) that is included in the History Frame 108 responds to the selection notification that is generated when the user selects a hyperlink from the Client Browser 102 User Interface 114. The History Frame Code Module 122 parses the selection notification to identify the Data Frame 106 (see FIG. 1) that corresponds to the selection notification. Specifically, during the parsing operation, the History Frame Code Module 122 extracts the URL value from the "href" resource attribute of the selection notification. In one embodiment of the present invention, the History Frame Code Module 122 is a Javascript application code module. However, it is important to note that the History Frame Code Module 122 can be implemented utilizing other stateless scripting languages, AJAX, etc.

In a register history operation 210, the URL value extracted in operation 210 which corresponds to the hyperlink selection of operation 204 is stored in the History Support Registry 126 (see FIG. 1) by the History Frame Code Module 122 (see FIG. 1) to provide history support for the Client Browser 102. As previously mentioned, in an embodiment of the present invention, the Client Browser 102 provides history support by registering the URL, which is specified in the resource attribute associated with the selected Hyperlink 118, in the History Frame 108.

In an identify data frame operation 212, the History Frame Code Module 122 identifies which Data Frame 106 contained in the Data Frame Registry 124 corresponds to the URL value extracted in operation 210. In one embodiment of the present invention, as previously mentioned, the History Frame 108 maintains a Data Frame Registry 124 of every Data Frame 106 that is associated with the Client Browser 102 to facilitate the identification process. After the Data Frame 106 corresponding to the URL value is identified, the method 200 continues with operation 214.

In a retrieve content data operation 214, the History Frame Code Module 122 instructs the Data Frame 106 identified in operation 212 to retrieve the content data contained at a location corresponding to the URL value from the Webmail Server 104 (see FIG. 1) or some other location. The method 200 continues with operation 216.

In a load content data operation 216, the Data Frame 106 identified in operation 212 loads the content data in the Client Browser 102 User Interface 114.

Regarding operations 214 and 216, in one embodiment of the present invention, the History Frame Code Module 122 can execute a Javascript function call to retrieve the content data and load the content data as follows:

<html>
</script>
</head>
<script language="Javascript">
. . .
function loadData(url, dataframe) {
parent.dataframe.location.href=url;
}
. . .
<a href="javascript:loadData('http:// . . . ', dataframe$_n$)" . . . a>

It is important to note, however, that the exemplary Javascript function call sequence illustrated above does not limit the embodiments of the present invention. Any stateless scripting language, AJAX, etc. can be used to perform the retrieve and load operations 214 and 216.

Advantageously, based on the discussion above, a method for enhancing the usability and scalability of Web-based browser applications is provided. In particular, the method allows a stateless multi-frame Web browser application to behave like a single-frame Web browser application through the use of a common data frame that acts as a "hidden" data frame to facilitate the registering of navigation history in a stateless Web browser environment.

Figure 3A:
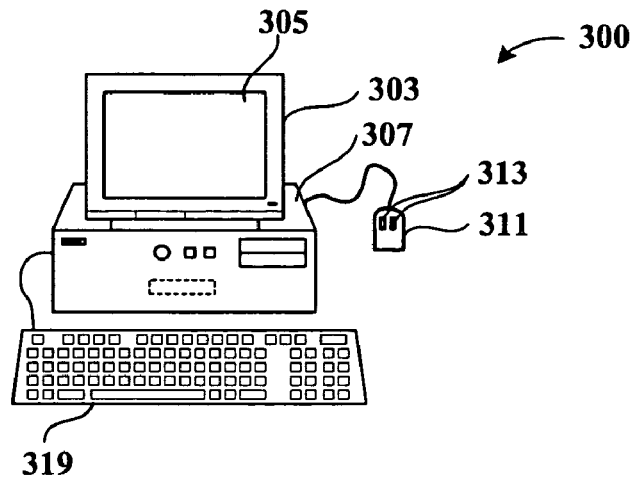
FIG. 3A is an illustration of a computer system suitable for use with the present invention.

In view of the discussion above, FIG. 3A is an illustration of an embodiment of a computer system 300 suitable for use with the present invention including display 303 having display screen 305. Cabinet 307 houses standard computer components (not shown) such as a disk drive, CDROM drive, display adapter, network card, random access memory (RAM), central processing unit (CPU), and other components, subsystems and devices. User input devices such as a mouse 311 having buttons 313, and keyboard 309 are shown.

Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 3B:
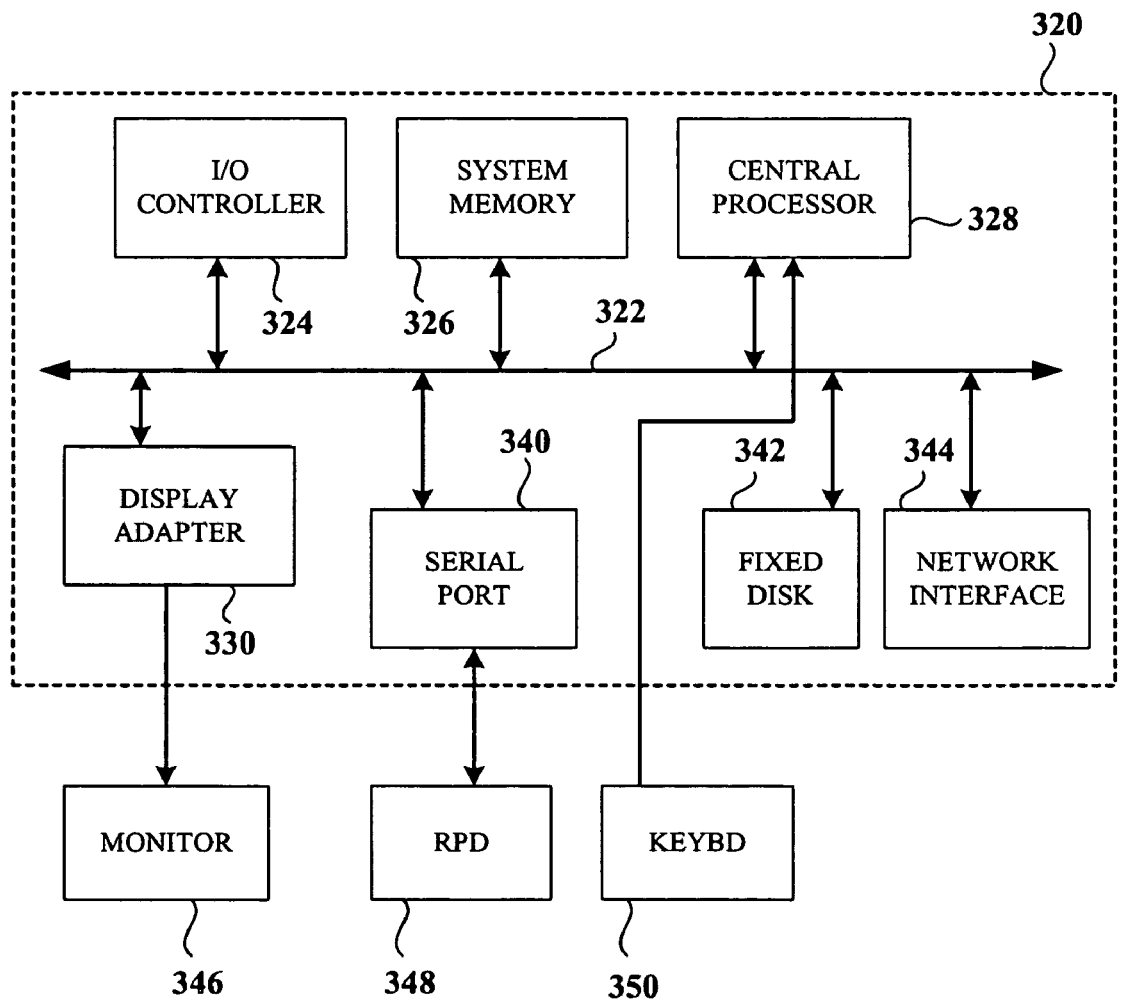
FIG. 3B shows subsystems in the computer system of FIG. 3A.

FIG. 3B illustrates subsystems that might typically be found in a computer such as computer 300. In FIG. 3B, subsystems within box 320 are directly interfaced to internal bus 322. Such subsystems typically are contained within the computer system such as within cabinet 307 of FIG. 3A. Subsystems include input/output (I/O) controller 324, System Random Access Memory 9RAM) 326, Central Processing Unit (CPU) 328, Display Adapter 330, Serial Port 340, Fixed Disk 342 and Network Interface Adapter 344. The use of bus 322 allows each of the subsystems to transfer data among the subsystems and, most importantly, with the CPU. External devices can communicate with the CPU or other subsystems via the bus 322 by interfacing with a subsystem on the bus. Monitor 346 connects to the bus through Display Adapter 330. A relative pointing device (RPD) 348 such as a mouse connects through Serial Port 340. Some devices such as a Keyboard 350 can communicate with the CPU by direct means without using the main data bus as, for example, via an interrupt controller and associated registers (not shown).

As with the external physical configuration shown in FIG. 3A, many subsystem configurations are possible. FIG. 3B is illustrative of but one suitable configuration. Subsystems, components or devices other than those shown in FIG. 3B can be added. A suitable computer system can be achieved without using all of the subsystems shown in FIG. 3B. For example, a standalone computer need not be coupled to a network so Network Interface 344 would not be required. Other subsystems such as a CDROM drive, graphics accelerator, etc. can be included in the configuration without affecting the performance of the system of the present invention.

Figure 3C:
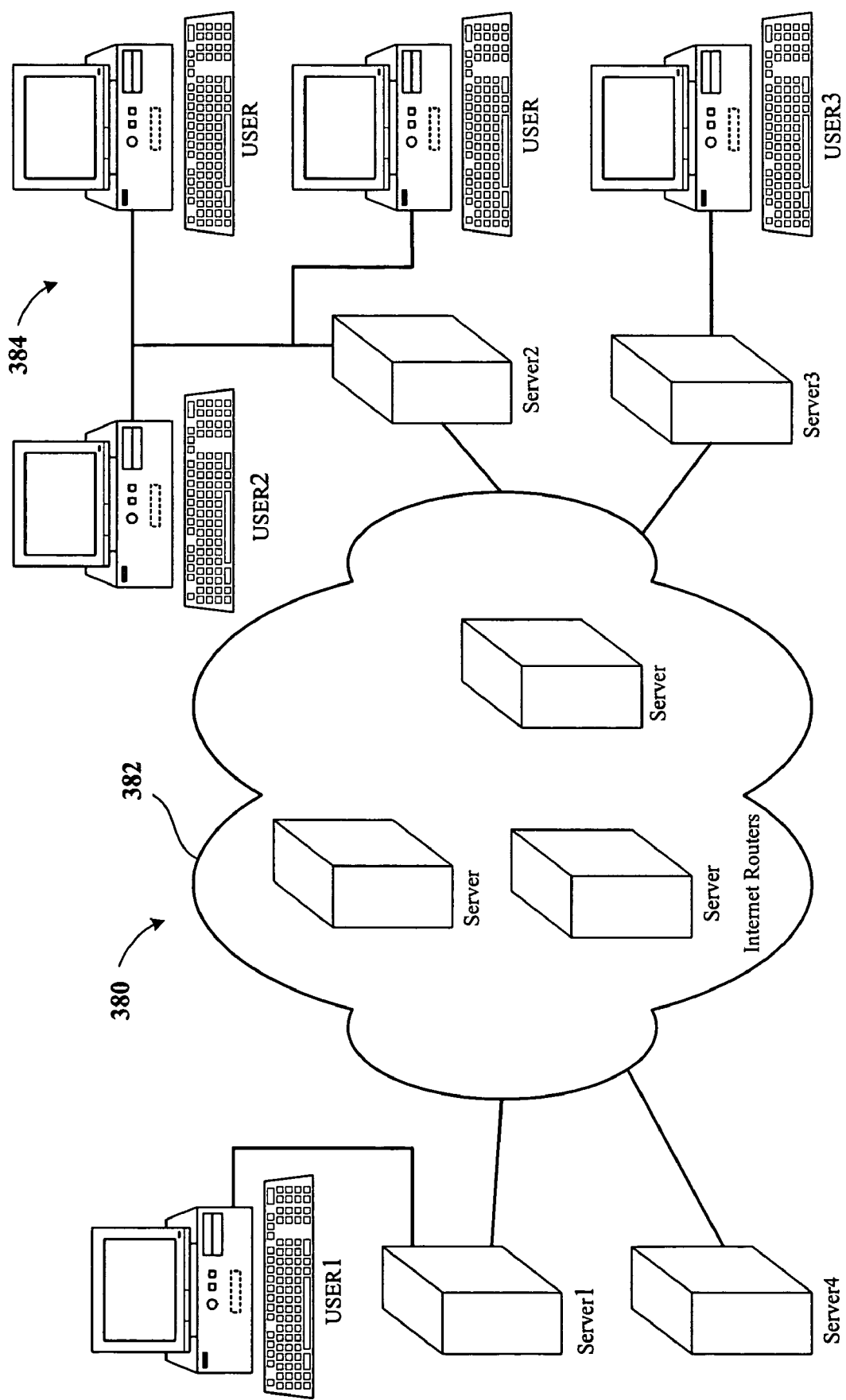
FIG. 3C is a generalized diagram of a typical network.

FIG. 3C is a generalized diagram of a typical network.

In FIG. 3C, the network system 380 includes several local networks coupled to the Internet. Although specific network protocols, physical layers, topologies, and other network properties are presented herein, the present invention is suitable for use with any network.

In FIG. 3C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of sever routers 382. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 384 are shown utilizing a local network at a different location from USER1 computer. The computers at 384 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically though of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for enabling a computer system to provide history support for multi-frame Javascript applications, the method comprising:
    enabling the execution of a Web-based browser, the Web-based browser being associated with:
        a plurality of data frames generated by a Javascript application, wherein each data frame of the plurality of data frames is stateless and capable of displaying content data, and
        a history frame, the history frame including a data frame registry having an entry for each data frame of the plurality of data frames and a history support registry storing content data;
    enabling the display of a hyperlink and a forward navigation or a backwards navigation component in a user interface controlling the Javascript application, wherein the hyperlink corresponds to a resource attribute and a target attribute, a value of the target attribute specifying the history frame;
    enabling the selection of the hyperlink, wherein selection of the hyperlink comprises generating a selection notification, the selection notification including a value of the resource attribute and the value of the target attribute;
    enabling a response to the selection notification, wherein the response to the selection notification comprises:
        parsing the selection notification to extract the value of the resource attribute,
        storing an entry corresponding to the selection of the hyperlink in the history support registry wherein the entry corresponding to the selection of the hyperlink comprises the value of the resource attribute,
        identifying a data frame from the plurality of stateless data frames, wherein the data frame corresponds to the value of the resource attribute,
        instructing the data frame to retrieve the content data from a location specified by the value of the resource attribute, and
        instructing the data frame to load the content data in the user interface; and
    enabling the selection of the forward navigation or backwards navigation component, wherein selection of the forward navigation or backwards navigation component comprises:
        locating an entry in the history support registry, the entry in the history support registry corresponding to the selection of the forward navigation or backwards navigation component, and
        reloading content data stored in the history support registry to the user interface, the content data corresponding to the entry in the history support registry.

2. The method of claim 1, wherein the value of the resource attribute corresponds to a resource.

3. The method of claim 2, wherein the resource is a file.

4. The method of claim 2, wherein the resource is a document.

5. The method of claim 1, wherein the value of the resource attribute is a Uniform Resource Locator (URL), and data content of the resource attribute saved in a cache directory of the Web-based browser through selection of the hyperlink is stored in the history support registry.

6. The method of claim 1, wherein responding to the selection notification further comprises utilizing a history frame code module to respond to the selection notification.

7. The method of claim 1, wherein the history frame code module is a Javascript-based history frame code module of a client.

8. The method of claim 1, wherein the selection notification is a Hyper Text Mark-Up Language (HTML) formatted notification.

9. A computer system for providing history support, comprising:
    a server code module capable of execution by the computer, the server code module capable of downloading content data;
    a client code module capable of execution by the computer, the client code module being associated with:
        a user interface, the user interface including a component corresponding to a resource attribute and a target attribute, wherein a selection of the component generates a selection notification, the selection notification including a value of the resource attribute and a value of the target attribute,
        a plurality of data frames, the data frames generated by a Javascript application, wherein each data frame of the plurality of data frames is stateless and capable of storing content data and loading content data in the user interface, and
        a history frame, wherein the value of the target attribute specifies the history frame and wherein the history frame is capable of:
            enabling the storage of a navigation history including an entry and content data corresponding to the selection of the component in a history support registry wherein the entry corresponding to the selection of the first component comprises the value of the resource attribute, enabling a response to the selection notification and identifying a data frame from the plurality of data frames, the data frame corresponding to the value of the resource attribute, enabling the data frame to retrieve content data from the server code module, and enabling the data frame to load content data in the user interface;

wherein each of the modules in the computer system for providing history support is executed by an integrated circuit.

10. The system as recited in claim 9, wherein the client code module generates the history frame and is a Web-based browser code module.

11. The system as recited in claim 9, wherein the component is a hyperlink.

12. The system as recited in claim 9, wherein the value of the resource attribute corresponds to a resource.

13. The system as recited in claim 12, wherein the resource is a file.

14. The system as recited in claim 12, wherein the resource is a document.

15. The system as recited in claim 9, wherein the value of the resource attribute is a Uniform Resource Locator (URL)), and data content of the resource attribute saved in a Web-based browser cache directory through selection of the hyperlink is stored in the history support registry.

16. The system as recited in claim 9, wherein the selection notification is a HTML formatted notification.

17. A method for enabling history navigation, comprising:

generating components to be rendered by a browser, at least one of the components being associated with a resource attribute and a target attribute, wherein selection of the at least one of the components is configured to initiate, referencing a history frame generated by an application of a client, the history frame corresponding to the target attribute in response to a selection notification generated by the selection of the at least one of the components, the history frame including logic for parsing the resource attribute from the selection notification to identify a stateless data frame, the stateless data frame being generated by a Javascript application, the stateless data frame further including stateless executable code to be rendered by the browser, and storing content data of the resource attribute of the selected component in a history support registry of the history frame, such that the history support registry having stored content data of the resource attribute enables history-based navigation of the stateless data frame through the browser utilizing stored content data in the history frame.

18. The method as recited in claim 17, wherein content data of the resource attribute saved in a Web-based browser cache directory through selection of the hyperlink is stored in the history support registry.

19. The method as recited in claim 17, wherein the history frame includes a data frame registry, the data frame registry registering the data frames that are rendered by the browser.

* * * * *

UNITED STATES PATENT AND TRADEMARK OFFICE
CERTIFICATE OF CORRECTION

| | | |
|---|---|---|
| PATENT NO. | : 7,698,256 B1 | Page 1 of 1 |
| APPLICATION NO. | : 11/291304 | |
| DATED | : April 13, 2010 | |
| INVENTOR(S) | : Zhao Y. Wang | |

It is certified that error appears in the above-identified patent and that said Letters Patent is hereby corrected as shown below:

In Sheet 4 of 6, Box No. 202, FIG. 2, line 1, delete "DISPLAYIN" and insert -- DISPLAYING --, therefor.

In Sheet 4 of 6, Box No. 202, FIG. 2, line 1, delete "COMPONET" and insert -- COMPONENT --, therefor.

In column 1, line 43, delete "Javscript" and insert -- Javascript --, therefor.

In column 13, line 28, in Claim 15, delete "(URL))," and insert -- (URL), --, therefor.

Signed and Sealed this
First Day of March, 2011

David J. Kappos
*Director of the United States Patent and Trademark Office*